United States Patent [19]
Yaginuma

[11] Patent Number: 5,325,409
[45] Date of Patent: Jun. 28, 1994

[54] FUEL ROD GUIDING APPARATUS AND METHOD THEREFOR

[75] Inventor: Yoshitaka Yaginuma, Tohkai, Japan

[73] Assignee: Mitsubishi Nuclear Fuel Co., Tokyo, Japan

[21] Appl. No.: 43,733

[22] Filed: Apr. 7, 1993

[30] Foreign Application Priority Data

Apr. 7, 1992 [JP] Japan .................. 4-085667

[51] Int. Cl.⁵ ............................. G21C 21/00
[52] U.S. Cl. ................................. 376/261
[58] Field of Search ............ 376/261, 260; 29/723, 29/906

[56] References Cited

U.S. PATENT DOCUMENTS

| | | | |
|---|---|---|---|
| 4,723,359 | 2/1988 | Blissell et al. | 376/261 |
| 4,731,219 | 3/1988 | Beneck et al. | 376/261 |
| 4,740,351 | 4/1988 | Katsumizu et al. | 376/261 |
| 4,793,962 | 12/1988 | Tsitsichvili | 376/261 |
| 4,981,640 | 1/1991 | Beneck et al. | 376/261 |
| 5,028,382 | 7/1991 | King, Jr. et al. | 376/261 |

Primary Examiner—Daniel D. Wasil
Attorney, Agent, or Firm—Oblon, Spivak, McClelland, Maier & Neustadt

[57] ABSTRACT

A guiding apparatus and a method are presented for efficiently guiding and loading fuel rods into a fuel assembly without introducing surface damage to the fuel rod. The apparatus simultaneously loads a row of fuel rods into the grid cells of the grids using the guiding device, disposed at the entry side of each grid. The guiding device includes a comb-shaped section and a freely detachably engaged bottom side wall plate, forming a plurality of guiding spaces to superimpose on the plurality of grid cells requiring fuel rods. The guiding device is provided with protective guiding strips which are inserted into the grid cells prior to inserting the fuel rods so as to protect the fuel rod surface from being scratched by the springs and dimples provided. The method of fuel rod insertion using the apparatus is as follows. The guiding spaces formed by the comb-shaped section and the bottom side wall plate are placed adjacent to the opening end surface of a row of grid cells. After the fuel rods are inserted, the comb-shaped section is separated from the bottom side wall plate, and is raised to the next row of horizontal grid cells. The detached bottom side wall plate located below the fuel rods is rotated away and then raised above the fuel rods to the next row of horizontal grid cells. The bottom side wall plate is now rotated back and reengaged with the comb-shaped section and the loading process is repeated for the row above.

16 Claims, 6 Drawing Sheets

FUEL ROD GUIDING APPARATUS AND METHOD THEREFOR

BACKGROUND OF THE INVENTION

1. Field of the Invention

The present invention relates to an assembling apparatus and an assembling method of a nuclear fuel assembly, and more specifically to a guiding apparatus which enables the insertion of fuel rods to be carried out efficiently and free of surface scratches.

2. Technical Background of the Invention

In general, pressurized light water nuclear reactors utilize a type of fuel assembly in which a number of fuel rods are arranged horizontally at regular intervals. The fuel assembly comprises an upper nozzle, a lower nozzle and a plurality of fuel rod supporting grids (shortened to grids henceforth), made of thin metal straps intersecting orthognally to form grid cells. Fuel rod-guide pipes and instrumentation pipes are inserted into the grid cells, and are fixed to the grids and also to the upper and the lower nozzles at the ends. Fuel rods are also inserted into and are supported elastically in the grid cells by means of springs formed inside the grid cells.

When assembling such a fuel assembly, there is a danger of introducing scratches on the surface of the fuel rods if the rods are inserted into the grid cells as they are, because of the presence of the fuel rod supporting springs and dimples which are formed inside the grid cells. To prevent such a surface damage to the fuel rods, the springs must temporarily be deactivated while the fuel rods are being inserted into the grid cells. However, the technology to successively deactivate a large number of springs formed on each strap in the assembly required a high precision in the tooling and advanced drive-control technology.

In view of such problems in the existing technology, there have been, prior to the present invention, alternative proposed techniques, such as those presented below.

An assembling method is known, in which surface scratches are prevented by applying a cylindrical protective sleeve on the fuel rod over its entire external surface before its insertion into the grid cells, and removing the sleeve after the insertion is completed. (Japanese Patent Application, First Publication, S53(1978)-11294)

Another approach is to insert a slitted cylindrical jig in the grid cell beforehand, and after placing the fuel rod in the jig, the jig is moved into the assembly with the fuel rod, and the jig is removed with the use of the slit. (Japanese Patent Application, First Publication, S60(1985)-50490)

Another method is to arrange a plurality of such slit tools in a line along the grid cells, and to insert a line of fuels rods all at once. (Japanese Patent Application, First Publication, S60(1985)-67891)

Yet another method is to insert a cylindrical plastic sheet into the grid cell prior to inserted a fuel rod in the plastic sheet. (Japanese Patent Application, First Publication, S60(1985)-181680)

Yet another method is to prepare a rattan type support made of a series of thin plastic strips, and arrange the supports in accord with the grid cells prior to inserting the fuel rods into the support. (Japanese Patent Application, First Publication, S60(1985)-213889)

Such method which utilize various protective covers between the grid cells and the fuel rods are effective in preventing the formation of surface scratches on the fuel rods, but none of them provided for an automated facility for insertion of a plurality of fuel rods efficiently. Therefore, the operation was labor-intensive, and a need existed to reduce the labor content associated with such operations.

SUMMARY OF THE INVENTION

The objective of the present invention is to present an apparatus and a method for efficiently loading the fuel rods automatically into a fuel assembly without introducing surface scratches on the cylindrical surface of the fuel rods.

The guiding apparatus of the present invention is present for simultaneously guiding a plurality of fuel rods into a supporting grid cell formed in a plurality of grids of a fuel assembly, so as not to introduce surface damage on the fuel rods during insertion, wherein the plurality of grid cells are formed by a latticed network of one set of straps and another set of straps orthogonal to the one set of straps, each strap provided with a plurality of springs and dimples; the apparatus comprising:

(a) guiding means disposed on the entry side of said supporting grid for guiding the fuel rods into the grid cells; and (b) driving means for driving the guiding means;

the guiding means comprising:

(c) a comb-shaped section having an elongated part extending coplanarly to a strap of one set of straps, and a plurality of dividing parts extending from the elongated part, each of the dividing parts being extended coplanarly to each strap of another set of straps;

(d) side wall plate disposed opposite to the elongated part of the comb-shaped section and freely separably engaged with the dividing parts of the comb-shaped section thereby forming guiding spaces for insertion of the fuel rods to correspond with the plurality of grid cells;

(e) a guiding strip disposed on each wall of said guiding space, extending in the exit direction of the fuel rods so as to contact a cylindrical surface of the fuel rod inserted into the grid cell;

wherein the driving means drives:

the comb-shaped section and the side wall plate as a unit towards and away from an opening end surface of the gird;

the comb-shaped section and the side wall plate towards and-away from one another; and the comb-shaped section and the side wall plate so as to engage with and disengage from each other.

The apparatus constructed as presented above is disposed at the entry side of the opening end surface of each of the grids, and is used to load a required number of fuel rods laterally arranged in a row into the grid cells of all the grids of the assembly.

A method is presented using the apparatus described above of guiding and inserting a plurality of fuel rods simultaneously into a fuel assembly from an entry side of the assembly comprising a plurality of grids having a plurality of grid cells formed by one set of straps and another set of straps orthognal to the one set of straps wherein all the straps have springs and dimples formed thereon, with using guiding means comprising:

a comb-shaped section having an elongated part extending parallel to one set of straps, and a plurality of dividing parts extending from the elongated part in parallel to a plurality of another set of straps orthognal to the one set of straps;

side wall plate disposed horizontally, and freely separably engaged with the comb-shaped section thereby forming guiding spaces for insertion of the fuel rods to correspond with the plurality of grid cells; and a guiding strip disposed on each wall of said guiding space, extending in the exit direction of said fuel rods so as to contact a cylindrical surface of the fuel rod disposed in the grid cell;

the method comprising the steps of:

(A) forming guiding spaces to correspond with the grid cells by engaging the side wall plate with the comb-shaped section, and disposing the guiding spaces adjacent to an opening end surface of the grid;

(B) inserting the guiding strips into a horizontal row of grid cells by advancing the guiding mechanism in the direction of the fuel rods;

(C) inserting a plurality of fuel rods into the guiding spaces formed by the guiding mechanism;

(D) withdrawing the guiding mechanism in the direction of the fuel rods so as to remove the guiding strips from the row of grid cells;

(E) raising the comb-shaped section of the guiding mechanism in parallel with the opening end surface of the grid, and in a parallel orientation to the side wall plate;

(F) rotating to move the side wall plate of the guiding mechanism to a region free from mechanical interference with the fuel rods;

(G) transferring the comb-shaped section and the side wall plate to another horizontal row, and repeating the steps A to G until the required grid cells of all the grids in the fuel assembly are filled with fuel rods.

In the above method of guiding, guiding spaces to correspond with the required grid cells into which the fuel rods are to be inserted are generated when the comb-shaped section is engaged with the side wall plate.

With the use of the driving device, the guiding apparatus is moved towards the exit side to position it close to the entry side of the opening end surface of each of the grids. In this condition, the straps provided on the guiding apparatus are inserted into the grid cells, and slides over the springs/dimples provided on the straps. When the fuel rods are inserted into the grid cells, the fuel rods slide over the guiding strips and the springs and dimples do not come into direct contact with the cylindrical surface of the fuel rods. Because the guiding strips are in a sheet form intervening between the fuel rods and the springs/dimples, the fuel rods enter the grid cells smoothly without introducing any scratches on the surface.

After the fuel rods are inserted completely into the assembly, the guiding apparatus is withdrawn by moving it away from the entry side, then the guiding strips clamped between the fuel rods and the springs/dimples are also withdrawn from the grid cells.

Subsequently, the comb-shaped section is separated from the side wall plate which is rotated away by pivoting around one end of the side wall plate, and the comb-shaped section is independently moved vertically to the next row of grid cells. The side wall plate is then raised to the next row of grid cells, and reengaged with the comb-shaped section. Thus the guiding apparatus has been moved from one of grid cells to the next row of grid cells situated above the previous row of grid cells. This process is repeated for the remaining grid cells in the grid until all the required grid cells are filled with the fuel rods.

According to the method described above, the fuel rods are inserted smoothly into the grid cells with the intervening strips between the fuel rods and the springs/dimples, thus positively preventing the introduction of scratches on the surface of the fuel rods. There is no need for deactivating the springs successively for the girds in the assembly, and a certain pressure is all that is needed initially to insert the fuel rods. Furthermore, for each row of grid cells, the superimposing guiding spaces are generated automatically, and a row of fuel rods are inserted simultaneously into the grid cells, thus improving the efficiency of assembling operation of the fuel assembly.

BRIEF EXPLANATION OF THE DRAWINGS

FIGS. 6 (a), (b) and (c) illustrate the operative steps of the guiding apparatus, and a method of inserting the fuel rods starting from the bottom horizontal row of the grid cells.

DETAILED EXPLANATION OF THE PREFERRED EMBODIMENT

An embodiment of the fuel rod guiding apparatus of the present invention, and the method of inserting fuel rods using the apparatus will be explained with reference to FIGS. 1 to 6. In the following explanations, the directions are referenced with respect to longitudinally extending fuel rods. The fuel rods P1 are inserted into the assembly, in the direction of the horizontal arrow shown in FIG. 3. The entry end is the left end of the fuel assembly, and the entry side is likewise the side from which the fuel enters a device or component. The vertical arrows, in FIG. 3 indicate the direction of raising or lowering of the fuel rods to load the fuel rods into the assembly.

Figure 1:
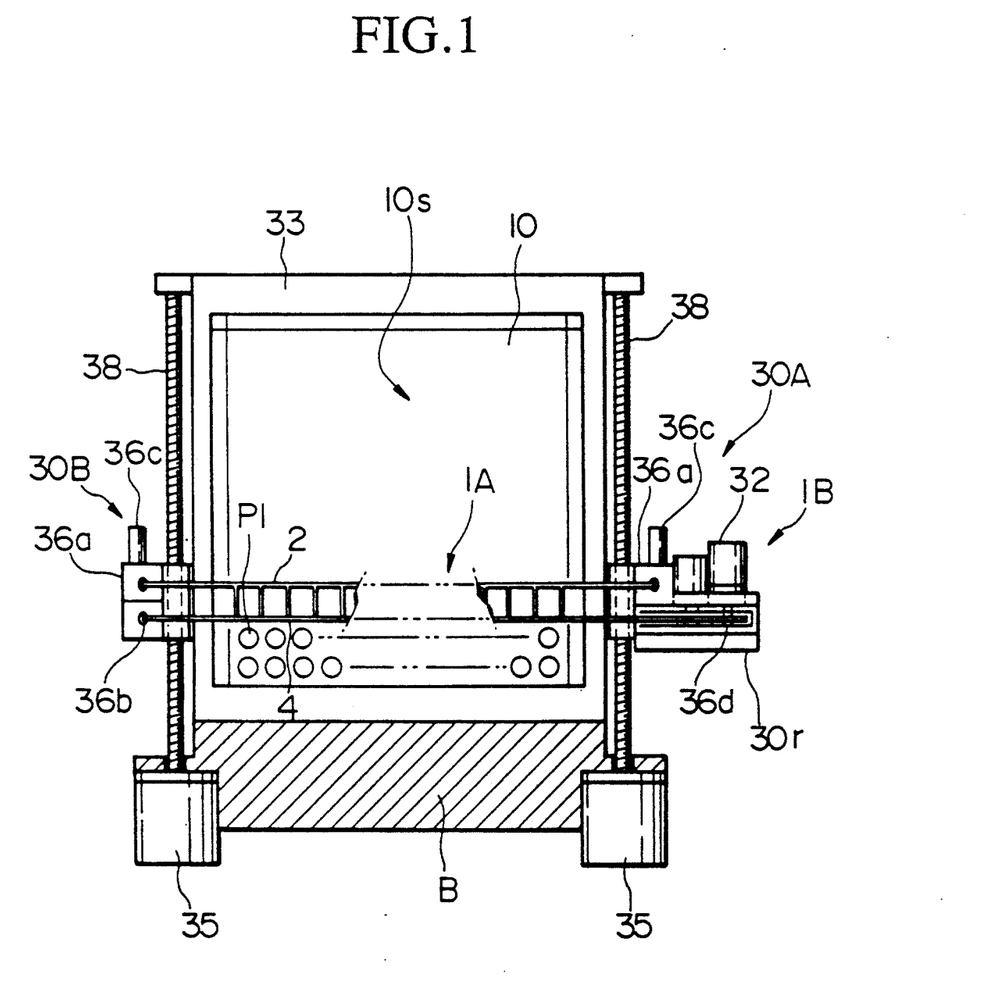
FIG. 1 is a front view of the fuel rod guiding apparatus of the present invention seen from the direction of insertion into the grid.
Figure 2:
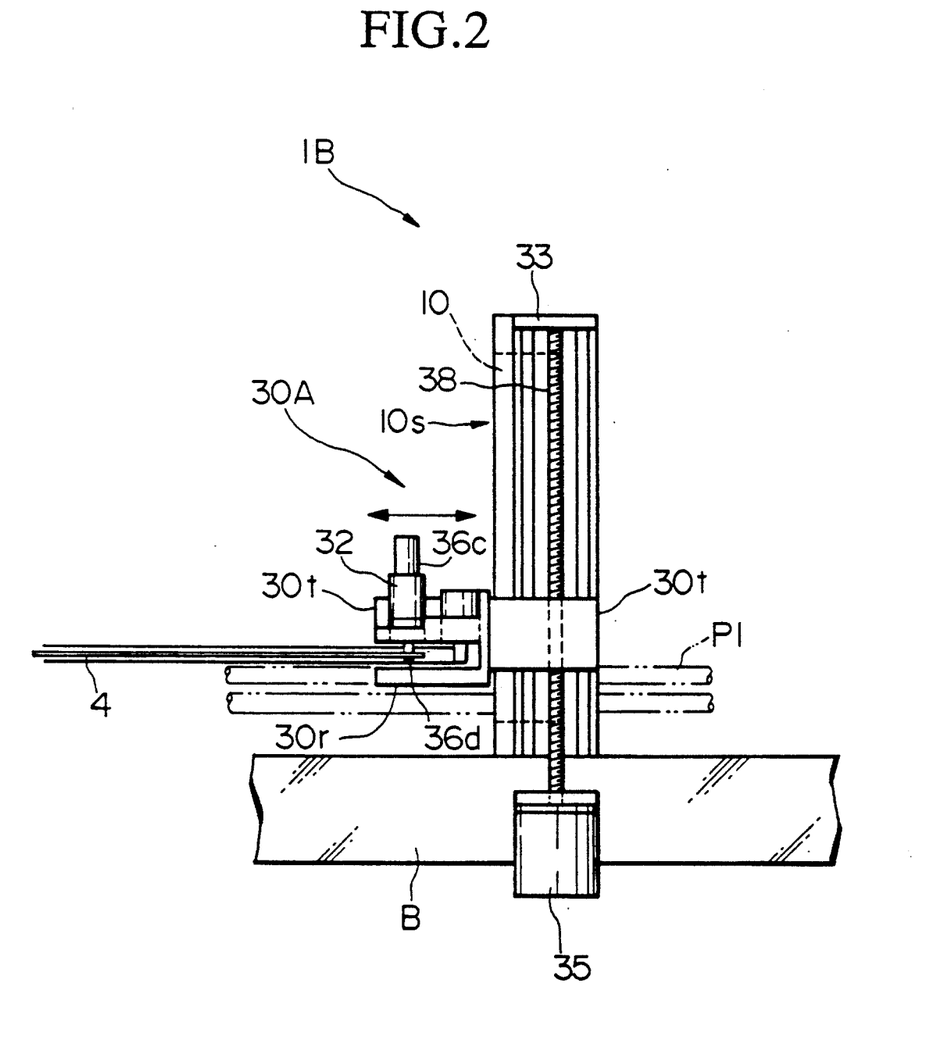
FIG. 2 is a side view of the fuel rod guiding mechanism of the present invention.
Figure 3:
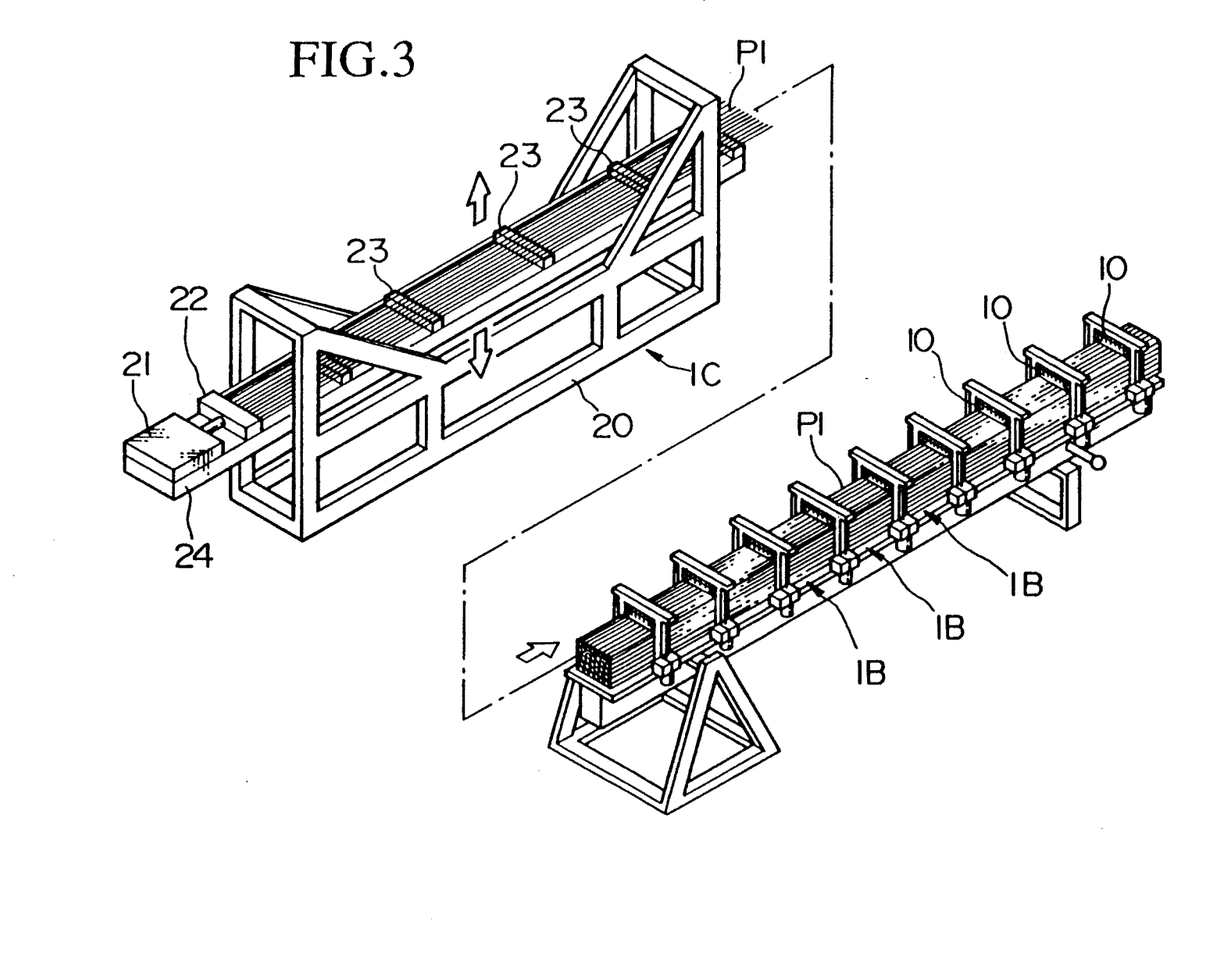
FIG. 3 is a schematic view of the fuel rods arranged on the fuel rod base for insertion into the grid cells.

FIG. 3 shows a plurality of fuel rods P1 disposed roughly horizontally on the fuel rod base 24 of the pushout device 1C, to produce a fuel assembly supported by a plurality of grids 10 with the driving mechanism 1B along side the guiding apparatus of the present invention. Each grid 10 is provided with a guiding apparatus of the same construction. The guiding apparatus, as shown in FIGS. 1 and 2, comprises: a guiding mechanism 1A which is disposed at the entry side of the opening end surface 10s of the grid 10; and driving mechanism 1B, for driving the guiding mechanism 1A, which is disposed on the outer vertical periphery of the grid 10.

Figure 4:
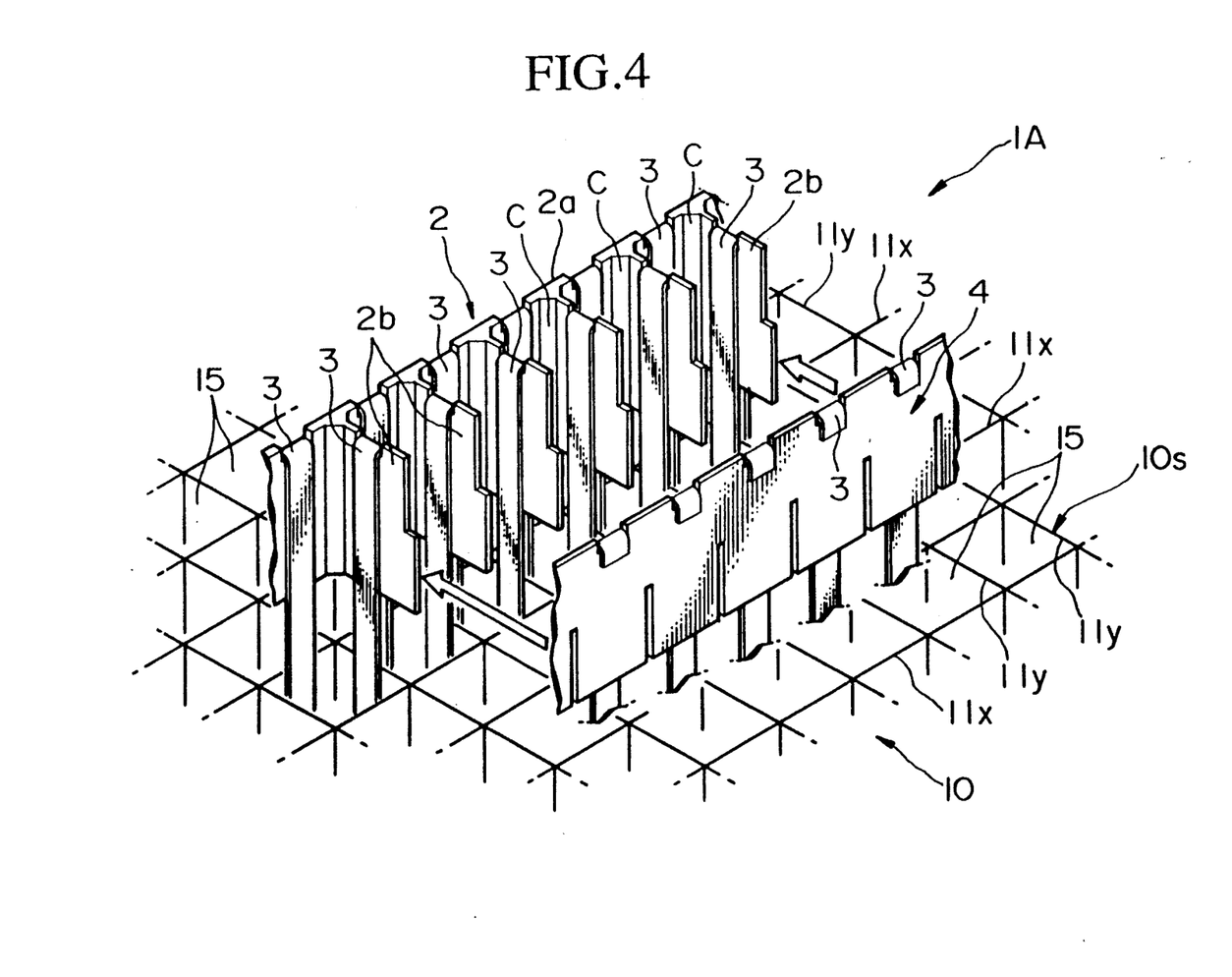
FIG. 4 is a perspective view showing the structure of the fuel rod guiding apparatus of the present invention.

The guiding mechanism 1A will be explained in further detail below with reference to FIG. 4. The guiding mechanism 1A comprises a comb-shaped section 2 and a side wall plate 4. The comb-shaped section 2 comprises: an elongated part 2 disposed in contact with or adjacent to one edge part of the strap 11x which forms a side wall of the grid cell 15; and a plurality of dividing parts 2b disposed in contact with or adjacent to the edges of the strap 11y which forms another side walls of the grid cell 15. The dividing parts 2b extend from the elongated part 2a to about the same distance as the width of the opening of the grid cell 15. The terminal ends of the dividing parts 2b have a cut out section which protrudes out slightly towards the entry side of the opening end surface 10s of the grid cell 15. In the meanwhile, the side wall plate 4 is constructed so that a plurality of regularly spaced slits are provided in the width direction of the grid cells 15. The side wall plate 4 is attached to the comb-shaped section 2b by engaging the slits with the protruded parts of the dividing part 2b, thereby forming roughly square guiding spaces C, in parallel to the opening end surface 10s, superimposed on a row of horizontally arranged grid cells 15.

The roughly square guiding spaces C are, therefore, also defined by the three walls of the comb-shaped section 2, i.e. the elongated part 2a, a pair of opposed dividing parts 2b, and by the side wall plate 4. Each of the four walls, i.e. the elongated part 2a, the pair of opposed dividing parts 2b and the side wall plate 4, are provided with a guiding strip 3. The guiding strips 3 extend in the exit direction of the fuel rod P1, as shown also in FIG. 5. The guiding strips 3 slide over the spring 12 and the dimples 13 which are formed on the surface of the straps 11x, 11y. The straps 3 are present temporarily between the fuel rod P1 and the springs 12/dimples 13 while the fuel rods P1 are being inserted into the grid cells 15.

Therefore, the guiding strips 3 should be as thin as allowable to permit being inserted horizontally into or withdrawn from the grid cells 15, by remaining straight during the insertion process. Therefore, the guiding strips 3 should have some toughness and elasticity, and can be made of a stainless steel thin strip of about 0.05 mm thickness, for example. To reduce friction between the fuel rod P1 and the guiding strip 3 and to prevent the formation of scratches, the surface of the guiding strips 3 is coated with a resin film, nitrocellulose for example, of about 0.05 mm thickness.

The guiding strip 3 is in a long strip form, and is applied to the comb-shaped part 2b by being folded in half longitudinally, and bonded to both side walls of the comb-shaped part 2b. The attachment of the guiding strip 3 to the elongated part 2a and the side wall plate 4 is made by folding one end of the guiding strip 3, engaging the fold with the end part of the elongated part 2a and of the side wall plate 4, and is extended at least to the surface of the wall which forms the guiding spaces C and bonded thereto. The guiding strips 3 are provided, on the elongated part 2a of the comb-shaped part 2 and on the side wall plate 4, at regular intervals corresponding to the spacing of the grid cells 15. On the dividing part 2b, the guiding strips 3 are provided in the central region thereof.

A driving mechanism 1B for driving the guiding mechanism 1A is shown in FIGS. 1 and 2. The driving mechanism 1B comprises: a frame body 33 surrounding the external vertical sides of the grid 10; a pair of freely vertically movable sliding device 30A, 30B, for supporting the guiding mechanism 1A, disposed on a pair of vertically parallel side walls of the frame body 33.

Shown in FIGS. 1 and 2 is the frame body 33 which is attached to the base B disposed below the grid 10 for insertion of the fuel rods P1 shown in FIG. 3. At each end of the base B in the width direction (horizontal direction in FIG. 1) is disposed a motor drive 35, such as a servo motor, which provides controlled direction and speed of rotation of a guide rod 38. The motor drive 35 is connected to the bottom of each of the guide rods 38, which may be ball screw drive, disposed parallel to the pair of vertical side walls of the frame body 33, to rotate each of the guide rods 38 in the same direction or in the opposite direction.

As shown in FIG. 2, the sliding device 30A comprises a retaining housing 30r, and a transfer housing 30t which moves the retaining housing 30r forward and backwards in the longitudinal direction of the fuel rod P1. Also, the sliding device 30B (not shown) is similarly constructed with a retaining housing 30r and a transfer housing 30t. The transfer housing 30t is screwed onto the guiding rod 38, and is moved vertically by the rotation of the guiding rod 38.

Further, as shown in FIG. 1, the retaining housing 30r of the right sliding device 30A and the retaining housing 30r of the left sliding device 30B are each provided with an upper support 36a which supports the lateral ends of the elongated part 2a of the comb-shaped section 2 of the guiding mechanism 1A. These upper supports 36a are made to move vertically through a stroke distance equal to the opening width of the grid cells 15 by a reciprocating device 36c, such as a pneumatic cylinder, provided on each retaining housing 30r. By this motion, the comb-shaped section 2 is able to be separated from the side wall plate 4 enabling only the comb-shaped section 2, and moved up independently of the side wall plate 4 to the next line of grid cells 15.

One side of the upper supports 36a is provided with a lower support 36b which supports one end of the side wall plate 4, and the other upper support 36a is provided with a lower support 36d which supports the other end of the side wall plate 4. The lower support 36d disposed on the retaining housing 30r is disposed on the end of a pivoting shaft of a driving motor 32, such as a servomotor. This configuration permits the side wall plate 4 to pivot around the lower support 36d, thus allowing the side wall plate 4 to be swung towards and away from the opening end surface 10s. FIG. 1 is a front view of the apparatus showing the side wall plate 4 in the loading position in which the side wall plate 4 is disposed perpendicular to the fuel rods P1 and parallel to the comb-shaped section 2. On the other hand, FIG. 2 is a side view showing the side wall plate 4 which has been swung away from the comb-shaped section 2, and is disposed nearly parallel to the fuel rods P1. The lower support 36d is provided with a sheath like spacer which moves along with the swing of the side wall plate 4, but out of the space associated with the fuel rod insertion, so as to control the vibration of the side wall plate 4 and to prevent the side wall plate 4 from touching the fuel rods P1.

Each retaining housing 30r having the above described construction is connected to the transfer housing 30t via a reciprocating device (not shown) housed in the transfer housing 30t. The movement of the reciprocating device (not shown) provides the forward and backward movement of the retaining housing 30r in the direction of the fuel rod P1, thereby enabling the guiding strips 3 disposed on the comb-shaped section 2 and the side wall plate 4 to be inserted into and withdrawn out of the grid cells 15.

When inserting the fuel rods P1 with the use of the driving mechanism 1B, it is preferable to use fuel rod push-out device 1C shown in FIG. 3 to save further effort. The fuel rod push-out device 1C is provided with a roughly horizontal fuel rod base 24 and a reciprocating device 21 which pushes the plurality of fuel rods P1 disposed thereon simultaneously towards the grids 10.

Divider bars 23 are provided on the top surface of the fuel rod base 24 in the width direction (perpendicular to the longitudinal direction of the fuel rods P1) to separate and space the fuel rods P1 at the correct distance to correspond with the spacing of the grid cells 15 of the grids 10. A fuel rod contact part 22 is provided at tip end of the cylinder rod of the reciprocating device 21 disposed at the entry end of the fuel rod base 24 for aligning the entry-side ends of the plurality of fuel rods P1 to enable all the fuel rods P1 in a row to be pushed out simultaneously. The fuel rod base 24 is disposed on the framing 20 via a pneumatic cylinder device to vertically move the fuel rods P1 to the loading position into the grids 10 while maintaining them horizontally.

As described above, the apparatus of the present invention is used to protect the surface of the fuel rods P1 when guiding and inserting a plurality of fuel rods P1 into a plurality of lattice-like grid cells 15 of the grids 10 formed by a plurality of mutually orthognal straps 11x, 11y which are provided with springs 12 and dimples 13. The apparatus is also provided with a guiding mechanism 1A and a driving mechanism 1B for driving the guiding mechanism 1A. The guiding mechanism 1A comprises: a comb-shaped sections 2 including an elongated part 2a; a plurality of dividing parts 2b extending from the elongated part 2a; and a side wall plate 4 which is engaged with the cut-out section of the dividing parts 2a; and guiding strips 3 extending longitudinally, which cover over the surface of the straps 11x, 11y. The guiding mechanism 1A extends in the width direction over the whole distance of a row of grid cells 15 of the grids 10. The driving mechanism 1B is constructed so that the guiding mechanism 1A can be made to approach towards or away from the opening end surface 10s, independently move the comb-shaped section 2 and the side wall plate 4 of the guiding mechanism 1A as a unit along a plane parallel to the opening end surface 10S, as well as swing the side wall plate 4 separately around a pivot disposed at one end of the side wall plate 4.

Next, the method for inserting the fuel rods P1 into the grids 10 using the guiding apparatus of the present invention will be explained with reference to FIG. 6 which illustrates the operating steps for the guiding mechanism 1A.

Figure 6A:
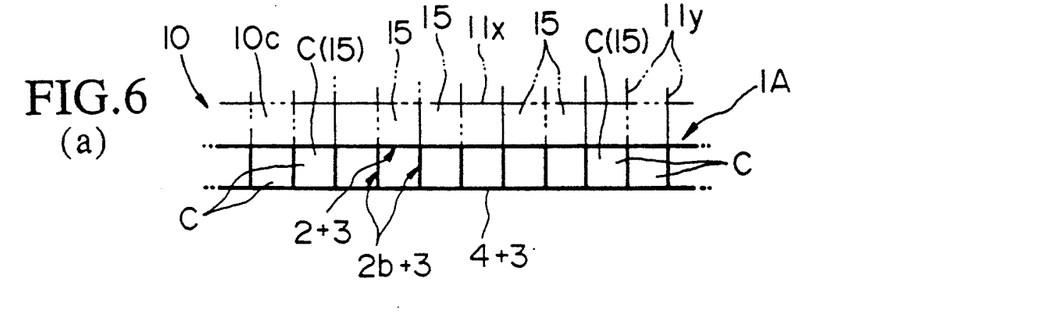
Figure 6B:
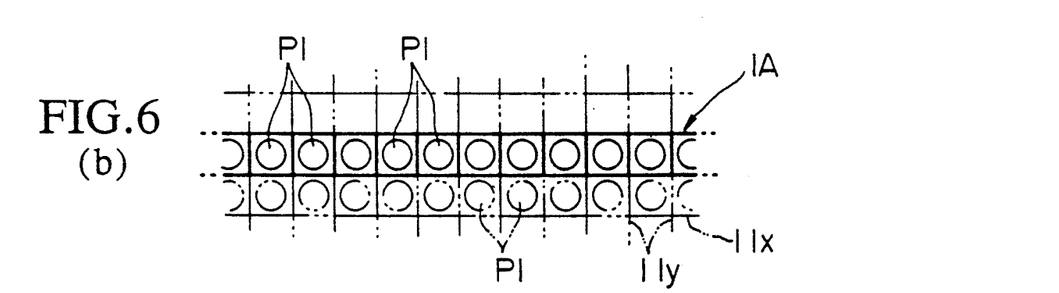
Figure 6C:
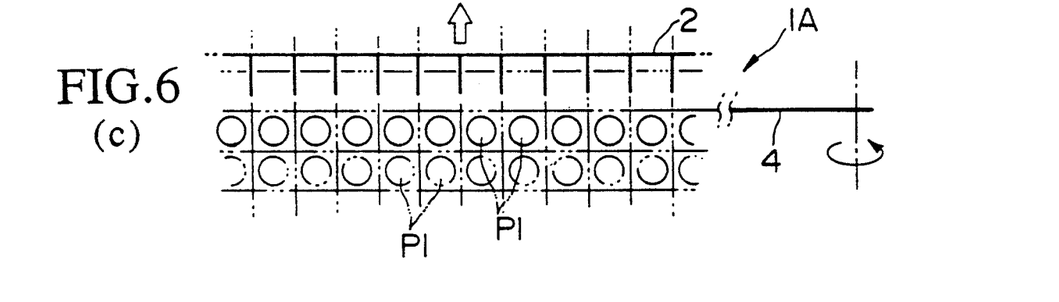

FIG. 6 is a view of a relevant section of the grids 10, and illustrates the basic steps for inserting a horizontal row of fuel rods P1 into the grid cells 15 of a square-shaped grid 10 disposed with its side surface resting on top of the base B. In this case, the insertion process can begin either from the top or bottom row of grid cells 15. The following illustration refer to the case of starting from a bottom horizontal row and working towards the top row of grid cells 15.

First, the driving mechanism 1B is operated to bring the guiding mechanism 1A in line with the bottom row of the grid cells 15 of the grid 10. The reciprocating device (not shown) housed in the transfer housing 30t of the sliding mechanism 30A, 30B is advanced, and each retaining housing 30r is separated from the transfer housing 30t. The driving motor 32 disposed on the retaining housing 30r is rotated, the reciprocating device 36c of the retaining housing 30r is retracted, and the side wall plate 4 is engaged with the dividing part 2b of the comb-shaped section 2 of the guiding mechanism 1A.

FIG. 6 (a) is a front view of the driving mechanism 1A which is positioned in front of the grid 10 with a small spacing. The guiding spaces C of the driving mechanism 1A defined by the comb-shaped section 2 and the side wall plate 4 engaged therewith are shown in bold line and is superimposed on the grid cells 15 shown in fine line. As shown in FIG. 6 (a), the elongated part 2a of the comb-shaped section 2 is aligned with the horizontal top strap 11x, and the dividing part 2b is aligned with the vertical straps 11y, and the side wall plate 4 inserted into the protruding part of the dividing part 2b is aligned with the bottom horizontal strap 11y.

Figure 5:
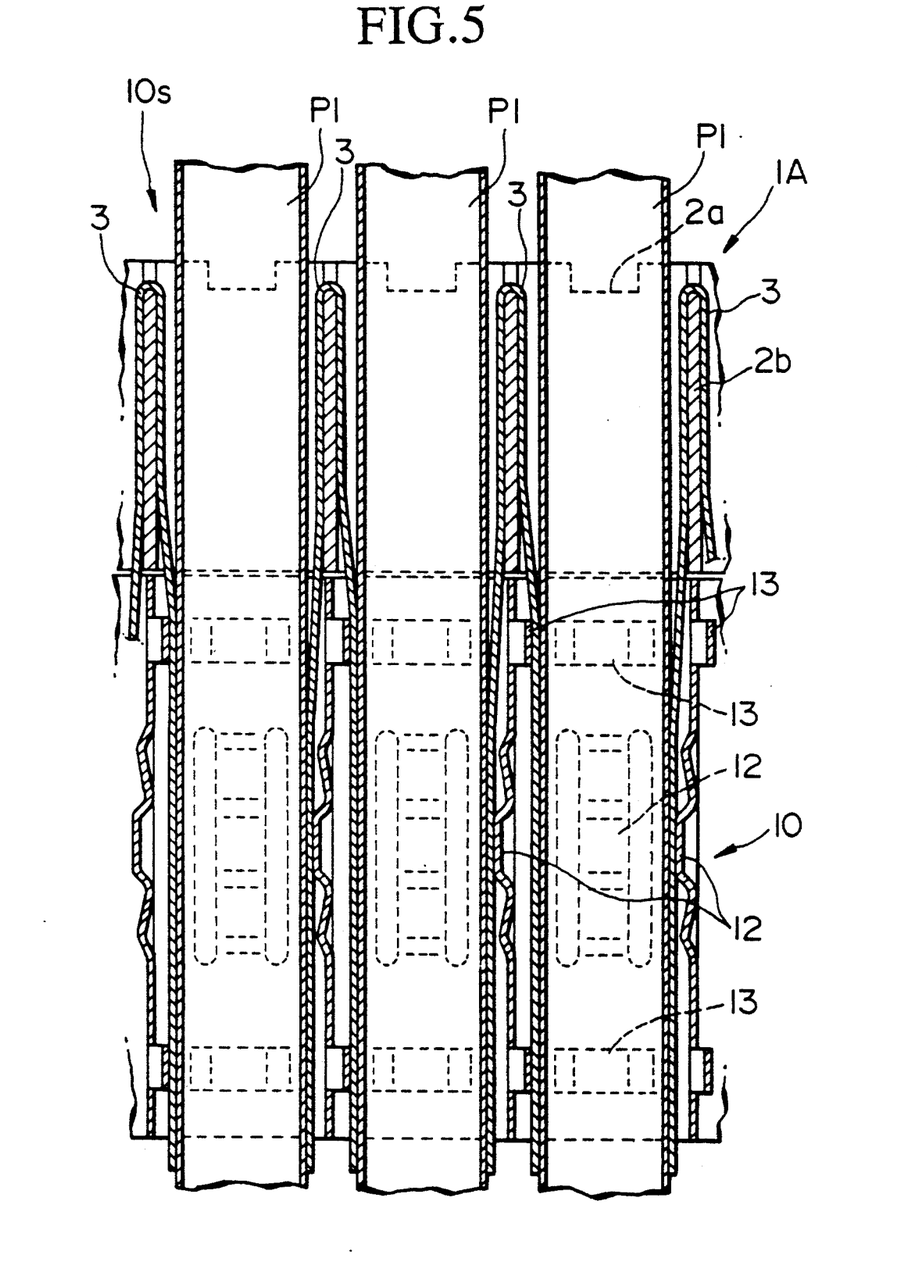
FIG. 5 is a partial cut away top view of the fuel rods inserted in the grids using the guiding apparatus of the present invention.

Next, by retracting the transfer housing 30t of the sliding device 30A and 30B, the initially separated retaining housing 30r is disposed in contact with the transfer housing 30t, and the guiding spaces C are brought close to the opening end surface 10s of the grid 10. In this condition, the extending guiding strips 3 which are provided on the elongated part 2a, on the dividing parts 2b and on the side wall plate 4 become inserted into the corresponding oppositely disposed grid cells 15. This condition is illustrated in FIG. 5, which is a plan view of the driving mechanism 1A adjoining the grid 10 in which three fuel rods P1 have been inserted. It can be seen that the guiding strips 3 extending into the grid 10 intervene between the fuel rods P1 and the springs 12/dimples 13, thereby protecting the surface of the fuel rods P1 from possible scratches caused by their sliding directly over the springs 12 and dimples 13.

In the meanwhile, a number of fuel rods P1 which are required to fill the number of grid cells in a horizontal row are readied on the fuel rod base 24 of the push-out device 1C. Next, the fuel rod base 24 is raised so as to align the fuel rods P1 with the grid cells 15, and the reciprocating device 21 is operated to simultaneously push the fuel rods P1 on the fuel rod base 24 into the grid cells 15.

FIG. 6 (b) shows the condition of a row of grid cells 15 after the fuel rods P1 have been inserted thereinto through the guiding spaces C of the guiding mechanism 1A. In this case, because the surface of the fuel rods P1 is protected by the guiding strips 3 disposed over the springs 12 and the dimples 13, a certain force is all that is required initially to insert the fuel rods P1 into the grid cells 15. Furthermore, because of the presence of the guiding strips 3, the surface of the fuel rods P1 is protected from potential scratches caused by the fuel rods P1 sliding directly on the springs 12 and dimples 13.

After having inserted a row of fuel rods P1 into the bottom row of grid cells 15, the retaining housing 30r and the reciprocating device housed in the transfer housing 30t are advanced. Then, the entire retaining housing 30r moves back longitudinally away from the grid 10. By this step, all the guiding strips 3 which are present between the fuel rods P1 and springs 12/dimples 13 are simultaneously withdrawn from the grid cells 15. Because the surfaces of the guiding strips 3 are covered with a sheet material of low frictional resistance such as a resin film, it is possible to withdraw the guiding strips 3 simultaneously and easily from the grid cells 15.

Next, the reciprocating device 36c provided on each of the retaining housing 30r is operated (extended) to lift the retaining housing 30r, thereby also raising the entire comb-shaped section 2 supported by the upper support parts 36a in a parallel orientation to the side wall plate 4 and along the plane parallel to the opening end surface 10s. The engagement between the comb-shaped section 2 and the side wall plate 4 is thus temporarily severed.

In this condition, the comb-shaped section 2 disengaged from the side wall plate 4 is able to be lifted to the next row of grid cells 15 above since there is no fuel rods P1 obstructing its path. However, the side wall plate 4 is disposed below the fuel rods P1 which have just been inserted into the bottom row of grid cells 15, and present a barrier to the vertical movement of the side wall plate 4. At this time, the driving motor 32 disposed on the retaining housing 30r is operated to swing the side wall plate 4, with the pivot at the lower support part 36d, away from the grid 10 so as to place the side wall plate 4 roughly parallel to the fuel rods P1. Next, the motor drives 35 provided on both sides of the base B are operated, thereby rotating the guiding rod 38 in one direction and driving the transfer housing 30t engaged with the ball screw guiding rod 38, thereby raising the retaining housing 30r. The new position of the comb-shaped section 2 and the side wall plate 4 is shown in FIG. 6 (c). Since the side wall plate 4 is out of the way by being rotated to the side of the grid 10, the guiding apparatus can now be moved upwards without interference from the fuel rods P1 which are inserted in the bottom row of grid cells 15.

After moving the comb-shaped section 2 and the side wall plate 4 into the next row of grid cells 15 above, the driving motor 32 is rotated in the opposite direction to that in the previous step, and the side wall plate 4 is rotated back by pivoting around the lower support part 36d to the region roughly parallel to the opening end surface 10s. The advanced (extended) reciprocating device 36c is retracted (contracted), thereby reinserting the dividing parts 2b of the comb-shaped section 2 into the slits of the side wall plate 4. The guiding spaces C to correspond with the row of grid cells 15 are now formed above the grid cells 15 into which the fuel rods P1 can be inserted. Another row of fuel rods P1 are then readied on the fuel rod base 24 of push-out device 1C, and the fuel rod base 24 is raised to align the fuel rod P1 with the new rows of grid cells 15.

The process of loading the fuel rods P1 is repeated by disposing the guiding mechanism 1A close to the grid 10 as before, and simultaneously inserting the fuel rods P1 into the grid cells 15 as before, thereby enabling to load the fuel rods P1 rapidly into all the Grid cells requiring fuel rods P1.

The method of loading the fuel rods P1 into a fuel assembly, using the loading apparatus according to the present invention has thus been demonstrated. In summary, the apparatus is used to insert fuel rods P1 into a plurality of grids 10 each having a plurality of latticed network of grid cells 15 formed by assembling a plurality of straps 11x, 11y provided with springs 12 and dimples 13. The guiding apparatus 1A comprises: a comb-shaped section 2 having a plurality of elongated parts 2a extending along the straps 11x, and the dividing parts 2b, of a length about equal to the opening width of the grid cells 15, extending along the straps 11y; the side wall plate 4 which is engaged with the open end of the dividing part 2b; and a plurality of guiding strips 3 which extend in the direction of the fuel rods P1 disposed so as to cover the surfaces of the straps 11x, 11y. The loading comprises the following essential steps:

(A) forming guiding spaces C to correspond with the grid cells 15 by engaging the side wall plate 4 with the comb-shaped section 2, and disposing said guiding spaces C adjacent to an opening end surface 10s of said grid 10;

(B) inserting the guiding strips 3 into a horizontal row of grid cells 15 by advancing the guiding mechanism 1A in the direction of the fuel rods P1;

(C) inserting a plurality of fuel rods P1 into the guiding spaces C formed by the guiding mechanism 1A;

(D) withdrawing the guiding mechanism 1A in the direction of the fuel rods P1 so as to remove the guiding strips 3 from the row of grid cells 15;

(E) raising the comb-shaped section 2 of the guiding mechanism 1A in parallel with the opening end surface 10s of the grid 10, and in a parallel orientation to the side wall plate 4;

(F) rotating the side wall plate 4 of the guiding mechanism 1A to a region free from mechanical interference with the fuel rods P1;

(G) transferring the comb-shaped section 2 and the side wall plate to another horizontal row, and repeating the above steps A to G until all the fuel rods are inserted into the required grid cells of the assembly.

According to the method of inserting the fuel rod P1 using the apparatus and the method of the present invention, the fuel rods P1 are in sliding contact with the guiding strip of a sheet form disposed between the fuel rod P1 and the springs 12/dimples 13, thereby positively preventing the formation of scratches on the surface of the fuel rods P1. Further, the fuel rods P1 can be inserted easily without the need for successively deactivating the springs 12 provided on the straps 11x, 11y. The guiding spaces C are created in a row to correspond with a row of grid cells 15 automatically and simultaneously for each of the grids 10 in an assembly, thereby enabling to perform efficient insertion operation for assembling the fuel rod P1.

In the embodiment presented the side wall plate 4 was disposed at the bottom so as to enable the fuel rods P1 to be charged into the assembly from the bottom row. It is obvious that the loading process can be performed equally efficiently by starting from the top row. In such a case, the guiding apparatus is inverted so that the side wall plate 4 become the top side wall plate, and the disengaged comb-shaped section 2 is lowered to the successive rows below the starting row. Many other variation of the basic designs are possible without deviating from the basic design concept of the present invention, and the present invention is limited only the claims which follow.

What is claimed is:

1. A fuel rod guiding apparatus for simultaneously guiding a plurality of fuel rods into a plurality of grid cells formed in a supporting grid of a fuel assembly, so as not to introduce surface damage on said fuel rods during insertion, wherein said plurality of grid cells are formed by a latticed network of one set of straps and another set of straps orthognal to said one set of straps, each strap provided with a plurality of springs and dimples; said apparatus comprising:

(a) guiding means disposed on the entry side of said supporting grid for guiding said fuel rods into said grid cells; and (b) driving means for driving said guiding means;

said guiding means comprising:

(c) a comb-shaped section having an elongated part extending coplanarly to a strap of one set of straps, and a plurality of dividing parts extending from said elongated part, each of said dividing parts being extended coplanarly to each strap of another set of straps;

(d) side wall plate disposed opposite to said elongated part of said comb-shaped section, and freely separably engaged with said dividing part of said comb-shaped section thereby forming guiding spaces for insertion of said fuel rods to correspond with said plurality of grid cells;

(e) a guiding strip disposed on each wall around each guiding space of said guiding spaces, extending in the exit direction of said fuel rod so as to contact a cylindrical surface of said fuel rod inserted into said grid cell;

wherein said driving means drives:

said comb-shaped section and said side wall plate as a unit towards and away from an opening end surface of said gird;

said comb-shaped section and said side wall plate towards and away from one another; and said comb-shaped section and said side wall plate so as to engage with and disengage from each other.

2. A guiding apparatus as claimed in claim 1, wherein a plane in which said plurality of fuel rods are arranged for simultaneous insertion into said supporting grid is parallel to said one set of straps.

3. A guiding apparatus as claimed in claim 1, wherein said one set of straps are aligned in a horizontal direction.

4. A guiding apparatus as claimed in claim 2, wherein said one set of straps are aligned in a horizontal direction.

5. A guiding apparatus as claimed in claim 1, wherein said side wall plate is supported freely rotatably at one end, and said driving means rotate said side wall plate pivoted at said one end.

6. A guiding apparatus as claimed in claim 2, wherein said side wall plate is supported freely rotatably at one end, and said driving means rotate said side wall plate pivoted at said one end.

7. A guiding apparatus as claimed in claim 3, wherein said side wall plate is supported freely rotatably at one end, and said driving means rotate said side wall plate pivoted at said one end.

8. A guiding apparatus as claimed in claim 4, wherein said side wall plate is supported freely rotatably at one end, and said driving means rotate said side wall plate pivoted at said one end.

9. A method of guiding and inserting a plurality of fuel rods simultaneously into a fuel assembly from an entry side of said assembly comprising a plurality of grids having a plurality of grid cells formed by one set of straps and another set of straps orthognal to said one set of straps wherein all the straps have springs and dimples formed thereon, with using guiding means comprising:

a comb-shaped section having an elongated part extending parallel to one set of straps, and a plurality of dividing parts extending from said elongated part in parallel to a plurality of another set of straps orthognal to said one set of straps;

side wall plate disposed horizontally, and freely separably engaged with said comb-shaped section thereby forming guiding spaces for insertion of said fuel rods to correspond with said plurality of grid cells; and a guiding strip disposed on each wall around each guiding space of said guiding space, extending in the exit direction of said fuel rods so as to contact a cylindrical surface of said fuel rod disposed in said grid cell;

said method comprising the steps of:

(A) forming guiding spaces to correspond with said grid cells by engaging said side wall plate with said comb-shaped section, and disposing said guiding spaces adjacent to an opening end surface of said grid;

(B) inserting said guiding strips into a horizontal row of grid cells by advancing said guiding mechanism in the direction of the fuel rods;

(C) inserting a plurality of fuel rods into the guiding spaces formed by said guiding mechanism;

(D) withdrawing said guiding mechanism in the direction of the fuel rods so as to remove said guiding strips from the row of grid cells;

(E) raising said comb-shaped section of said guiding mechanism in parallel with said opening end surface of said grid, and in a parallel orientation to the side wall plate;

(F) rotating to move said side wall plate of said guiding mechanism to a region free from mechanical interference with the fuel rods;

(G) transferring said comb-shaped section and said side wall plate to another horizontal row, and repeating the steps A to G until the required grid cells of all the grids in said fuel assembly are filled with fuel rods.

10. A method as claimed in claim 9, wherein a plane in which said plurality of fuel rods are arranged for simultaneous insertion into said supporting grid is parallel to said one set of straps.

11. A method as claimed in claim 9, wherein said one set of straps are aligned in a horizontal direction.

12. A method as claimed in claim 10, wherein said one set of straps are aligned in a horizontal direction.

13. A method as claimed in claim 9, wherein said side wall plate is supported freely rotatably at one end, and said driving means rotate said side wall plate pivoted at said one end.

14. A method as claimed in claim 10, wherein said side wall plate is supported freely rotatably at one end, and said driving means rotate said side wall plate pivoted at said one end.

15. A method as claimed in claim 11, wherein said side wall plate is supported freely rotatably at one end, and said driving means rotate said side wall plate pivoted at said one end.

16. A method as claimed in claim 12, wherein said side wall plate is supported freely rotatably at one end, and said driving means rotate said side wall plate pivoted at said one end.

* * * * *